United States Patent
Nguyen et al.

(10) Patent No.: US 12,541,389 B2
(45) Date of Patent: Feb. 3, 2026

(54) SYSTEM CALL TRACE RECONSTRUCTION

(71) Applicant: Mellanox Technologies, Ltd., Yokneam (IL)

(72) Inventors: Thanh Ngoc Nguyen, Huntsville, AL (US); Meni Orenbach, Giv'atayim (IL); Ahmad Atamli, Oxford (GB)

(73) Assignee: Mellanox Technologies, Ltd., Yokneam (IL)

( * ) Notice: Subject to any disclaimer, the term of this patent is extended or adjusted under 35 U.S.C. 154(b) by 632 days.

(21) Appl. No.: 17/890,850

(22) Filed: Aug. 18, 2022

(65) Prior Publication Data
US 2023/0068546 A1   Mar. 2, 2023

Related U.S. Application Data

(60) Provisional application No. 63/359,750, filed on Jul. 8, 2022, provisional application No. 63/239,966, filed on Sep. 2, 2021.

(51) Int. Cl.
| | | |
|---|---|---|
| *G06F 9/45* | (2006.01) | |
| *G06F 9/448* | (2018.01) | |
| *G06F 9/455* | (2018.01) | |

(52) U.S. Cl.
CPC .......... *G06F 9/45558* (2013.01); *G06F 9/448* (2018.02)

(58) Field of Classification Search
CPC ...... G06F 9/45558; G06F 9/448; G06F 21/53; G06F 21/554; G06F 21/566; G06F 2009/45587
See application file for complete search history.

(56) References Cited

U.S. PATENT DOCUMENTS

| | | | | |
|---|---|---|---|---|
| 2003/0084256 A1* | 5/2003 | McKee | ............... | G06F 12/1491 711/206 |
| 2004/0024729 A1* | 2/2004 | Worley | ................... | G06F 12/10 |
| 2005/0050305 A1* | 3/2005 | Kissell | .................. | G06F 9/3851 712/E9.032 |
| 2005/0204205 A1* | 9/2005 | Ring | ....................... | G06F 21/57 714/47.1 |
| 2007/0266421 A1* | 11/2007 | Vaidya | ..................... | H04L 63/20 726/1 |
| 2009/0172330 A1* | 7/2009 | Dewan | .................. | G06F 12/145 711/E12.001 |
| 2010/0128866 A1* | 5/2010 | Irun-Briz | .............. | G06F 9/4484 379/265.02 |

(Continued)

*Primary Examiner* — Tuan C Dao
(74) *Attorney, Agent, or Firm* — Lowenstein Sandler LLP

(57) ABSTRACT

Technologies for system call trace reconstruction are described. A method includes determining, by one or more processors, a set of memory locations of a kernel memory structure. The set of memory locations stores data indicating one or more parameters of a user-associated process. The method further includes determining that a first value of a first of the set of memory location has changed. The method further includes determining an execution of a first system call associated with the user-associated process and the kernel memory structure. The method further includes retrieving one or more values corresponding to individual memory location of the set of memory location associated with the first system call. The method further includes providing an output identifying the first system call based on the one or more values corresponding to the individual memory locations.

20 Claims, 6 Drawing Sheets

(56) References Cited

U.S. PATENT DOCUMENTS

| | | | |
|---|---|---|---|
| 2012/0204062 A1* | 8/2012 | Erickson | G06F 11/3636 |
| | | | 714/E11.029 |
| 2015/0186643 A1* | 7/2015 | Tu | G06F 21/53 |
| | | | 726/23 |
| 2016/0119349 A1* | 4/2016 | Wang | H04L 63/06 |
| | | | 713/168 |
| 2016/0179714 A1* | 6/2016 | Acharya | G06F 9/3879 |
| | | | 711/158 |
| 2017/0109082 A1* | 4/2017 | Govindaraju | G06F 3/065 |
| 2017/0123971 A1* | 5/2017 | Kanaujia | G06F 12/0246 |
| 2017/0192810 A1* | 7/2017 | Lukacs | G06F 21/56 |
| 2017/0344731 A1* | 11/2017 | Gefflaut | G06F 21/6218 |
| 2018/0082060 A1* | 3/2018 | Tolpin | G06F 21/554 |
| 2018/0253369 A1* | 9/2018 | O'Dowd | G06F 11/3636 |
| 2019/0034340 A1* | 1/2019 | Doshi | G06F 13/1668 |
| 2019/0087305 A1* | 3/2019 | Mola | G06F 12/084 |
| 2019/0205533 A1* | 7/2019 | Diehl | G06F 21/567 |
| 2019/0332461 A1* | 10/2019 | Chaiken | G06F 11/0754 |

\* cited by examiner

SYSTEM CALL TRACE RECONSTRUCTION

RELATED APPLICATIONS

This application claims the benefit of U.S. Provisional Application No. 63/239,966, filed Sep. 2, 2021, and U.S. Provisional Application No. 63/359,750, filed Jul. 8, 2022, the entire contents of which are being incorporated herein by reference.

TECHNICAL FIELD

At least one embodiment pertains to system call trace reconstruction. For example, at least one embodiment pertains to live stack tracing.

BACKGROUND

Cyber-attacks commonly use malware as a means for damages and/or destroying computers and/or computer systems. A widely used method of preventing malware is virtual machine introspection (VMI). Through forensic analysis of volatile memory, VMI detects malicious programs that have infiltrated virtual machines (VMs). When incidents occur, memory forensics can be used to gather information. By inferring the current state of a VM, such as active processes and loaded kernel modules, one can determine its current state. By analyzing the current state of the VM, malicious activity can be detected. In contrast, disk forensics examines the artifacts left behind by cyber-security attacks. It makes it harder for malware to remain undetected by using memory forensics to build a behavioral landscape of malware and advanced persistent threats.

BRIEF DESCRIPTION OF DRAWINGS

Various embodiments in accordance with the present disclosure will be described with reference to the drawings, in which.

DETAILED DESCRIPTION

Figure 1:
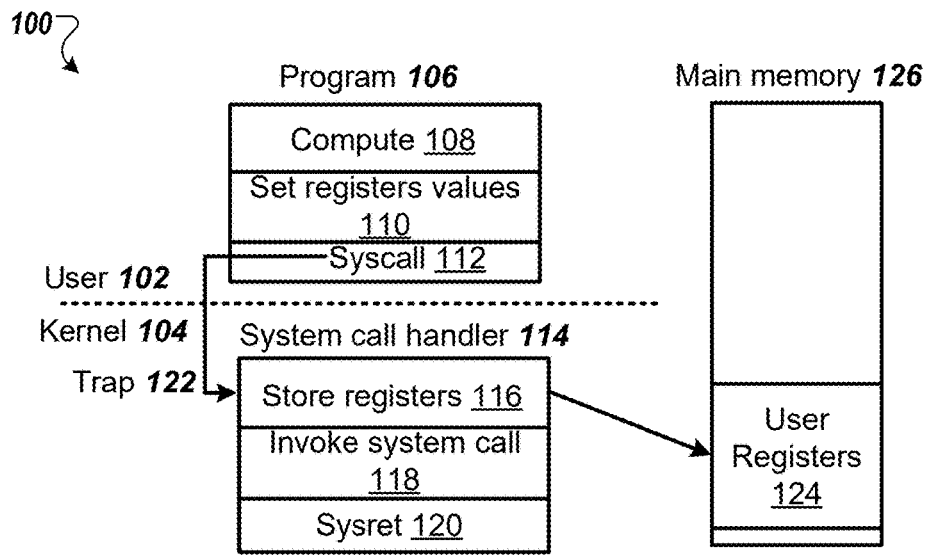
FIG. 1 illustrates a block diagram of a system call invocation flow, in accordance with at least some embodiments.

Technologies for system call trace reconstruction are described. As described above, cyber-attacks commonly use malware as a means for damages and/or destroying computers and/or computer systems. A widely used method of preventing malware is virtual machine introspection (VMI). Through forensic analysis of volatile memory, VMI detects malicious programs that have infiltrated virtual machines (VMs). When incidents occur, memory forensics can be used to gather information. By inferring the current state of a VM, such as active processes and loaded kernel modules, one can determine its current state. By analyzing the current state of the VM, malicious activity can be detected. In contrast, disk forensics examines the artifacts left behind by cyber-security attacks. It makes it harder for malware to remain undetected by using memory forensics to build a behavioral landscape of malware and advanced persistent threats.

Cyber-crime is advancing, making detecting malware more challenging due to malware's increasing ability to evade detection systems. A system call trace records the operations performed by the malware. Trace system calls typically use memory forensic methods that operate on raw memory images and analyze kernel thread stack state to infer executed system calls. Trap-based methods use a processor's ability to hook into events such as system calls, allowing a hypervisor to track each executed call. VMs can be traced via their guest operating systems (OS) with the help of tools installed in them, such as "strace." However, this may result in a non-negligible degradation of performance for conventional systems.

An observer effect can also result from in-guest tracing tools. A sophisticated malware program can detect tracing tools and disable them, for example, by hiding the malware behavior or disabling them completely. In order to reduce malware's ability to avoid detection, VMI techniques can place data acquisition methods outside the infected virtual machine.

VMI methods are intrusive and can impact the performance of programs running in a virtual machine. These methods interfere with the execution of code, so they are classified as intrusive. In trap-based methods, a VM must exit and re-enter, resulting in a high latency penalty. Due to the fact that existing memory forensic methods operate on a static raw memory image, recording a live system call trace of processes running in the VM may require pausing the VM after each system call, acquiring the raw memory image, interpreting the call, and resuming it afterward. Tracing live VMs using memory forensic techniques combined with trap-based approaches can also affect the VM's performance and security analysts' response time.

Due to non-intrusive system calls' goal of not interfering with VM execution, tracing non-intrusive system calls through VMI is difficult. For non-intrusive tracing, a separate thread is usually used to actively trace executed system calls without special hardware support. For live introspection to work properly, the tracing must be faster than the system calls. Otherwise, an executed system call would not be detected. Current programs heavily rely on processors to optimize system call invocation latency. Therefore, it typically takes a long time to analyze an entire raw memory image with current software-only methods.

Aspects and embodiments of the present disclosure can provide a method and/or tool for non-intrusive system call tracing on live processors (e.g., such as VMs running on the Linux x86_64 OS). To trace system calls for a particular process, input of a security analyst may indicate a process identifier to pass to the tool. In response, the tool can analyze the processor's memory to recover register data that the OS stores when system calls are invoked. Using the register values, the tool can construct the system call trace.

Aspects of the present disclosure are directed to overcoming the challenge of implementing a non-intrusive tracer that is faster than any system calls. Specifically, aspects of the present disclosure can pinpoint the exact physical addresses of the registers used to recover the system calls by caching their virtual-to-physical translation. Aspects of the present disclosure can further include communicating these addresses to a dedicated memory sampling framework such as a quick emulator (QEMU) hypervisor. Aspects of the present disclosure can further include using the same register values for detecting system call execution and/or recovering system call information.

In an example embodiment, a method includes determining, by one or more processors, a set of memory locations of a kernel memory structure. The set of memory locations can store data indicating one or more parameters of a user-associated process. The method further includes determining that a first value of a first memory location of the set of memory location has changed. The method further includes determining an execution of a first system call associated with the user-associated process and the kernel memory structure. The method further includes retrieving one or more values corresponding to individual memory locations of the set of memory locations associated with the first system call. The method further includes providing an output identifying the first system call based on the one or more values corresponding to the individual memory locations.

Aspects of the present disclosure can improve conventional system call tracing technology by providing system, method, devices capable of live system call tracing that is not dependent on post-mortem (e.g., offline) reconstruction of memory structures. Aspects of the present disclosure provide technology that enables obtaining and analyzing system calls without disruption to ongoing system processes (e.g., without added latency). Further aspects of the present disclosure may invoke non-intrusive monitoring techniques that are much more difficult for modern malware to detect and content with.

FIG. 1 illustrates a block diagram 100 of a system call invocation flow, in accordance with at least some embodiments. Main memory 126 may have registers allocated within kernel space 104 and some within user space 102. During an execution of an operating system (OS) kernel, application threads can run in a physical core in unprivileged mode. Applications may execute in this unprivileged mode until a trap handler transfers control back to the kernel in privileged mode. Invoking system calls 112 can involve the same process. Applications can use processor instructions (e.g., int 0x80 or syscall in the x86 architecture) to transfer control to the trap handler that executes the requested system call.

Function wrappers for system calls can abstract OS-specific functionality from system calls. It is possible, for example, to read data from an open file handler using libc's "fread( )" method to call the corresponding Windows and Linux system calls. Internally, these wrappers set processor registers according to a defined calling convention that is adhered to by both the OS and the processor. For example, a system call number and its results are stored in the "rax" register in x86_64 Linux kernels. In addition, "rdx" is used to signal an error, while "rdi," "rsi," "rdx," "r10," "r8," and "r9" are used to pass system call arguments.

The OS system call handler 114 can save the user registers 124, invoke the requested system call 112, and set the return value in the appropriate register. Before returning execution to the unprivileged program, the registers that are not defined as callee-clobbered can be restored by the kernel.

Virtual machine introspection (VMI) can refer to a technique that monitors the state of a virtual machine and performs forensic analysis on it. In some embodiments, VMI utilizes a hypervisor that may include a layer of software that runs on top of the hardware to manage VMs. The hypervisor can access VM memory, and apply traps 122, which enables information acquisition on the VM internal state. The hypervisor may execute in a higher privilege mode than the VMs and can be unaffected by processes executing in them.

Different frameworks may be leveraged to automate the process of VMI for different OSes such as Linux and Windows. These frameworks can facilitate the implementation of memory forensic tools that bridge the semantic gap and learn the behavior of processes executing within a VM.

Live analysis of user register values 124, including setting register values 110 and storing register values 116, are incorporated into an endpoint intrusion detection system (IDS). IDS detects malware by continuously introspecting the status and the behavior of VMs.

Some systems use high-intrusive methods that leverage agents installed inside VMs to communicate with the introspection tools. However, agents are susceptible to malware and can have to comply with installation rules that can require changes to VMs that are not authorized for certain users. In some systems, less-intrusive methods may utilize hypervisor control over VM execution. For example, the hypervisor can pause the VMs via traps. Specifically, introspection tools may read data that is being modified. Inconsistent data read may cause the introspection tools to fault or report incorrect results. VM pausing methods may also have a severe impact on the introspected application's performance.

Aspects of the present disclosure leverage non-intrusive methods. Use of non-intrusive methods removes the dependency on the hypervisor capability to pause and/or resume the VM. Further, use of the non-intrusive methods may not affect the execution of traced processes.

Figure 2:
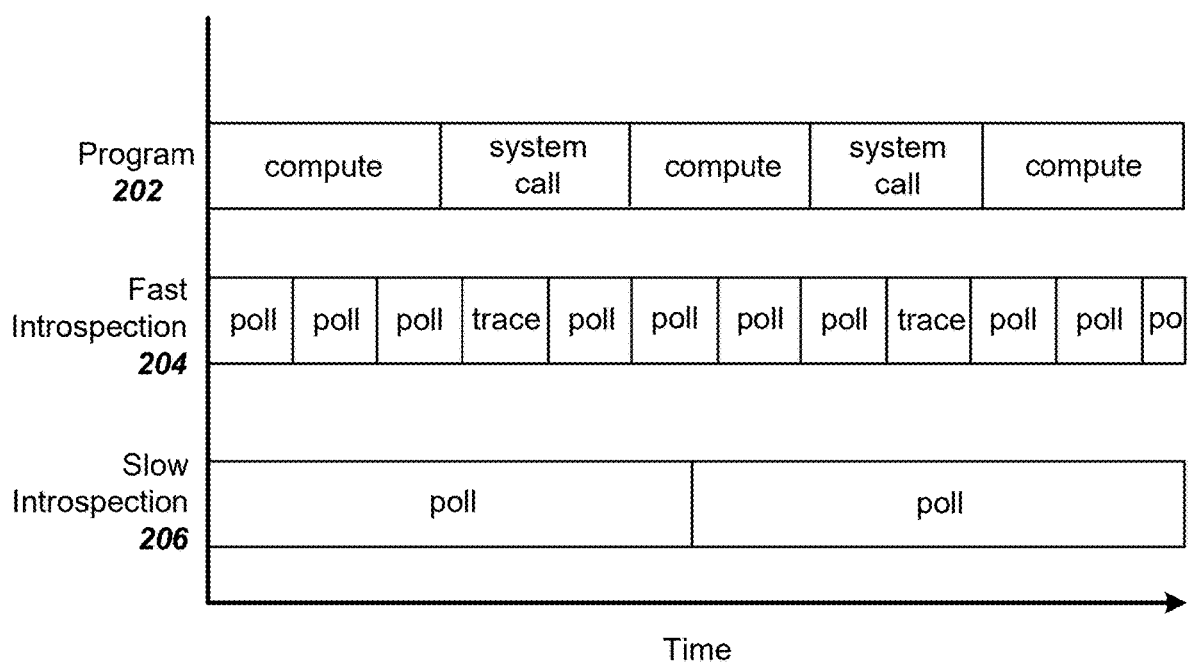
FIG. 2 is a diagram illustrating system call tracing, according to at least one embodiment.

FIG. 2 is a diagram 200 illustrating system call tracing, according to at least one embodiment. Given a raw live image of a guest, tracing system calls can be achieved by detecting whether a system call is currently executing, and recovering the computing processing unit (CPU) register values. Detecting system calls using traps may include placing traps on the system call handler address. The address is obtained from the OS intermediate symbol table (IST) generated from a map file (e.g., Linux's system map file). However, placing traps on every system call can cause a slowdown in the guest processing execution. A guest may refer to a virtual machine, a guest OS, a container, or any other execution environment within a computer system. The slowdown can be due, at least in part, to a transfer of control (e.g., a VM exit) to a host OS or hypervisor, occurring on each trap.

As shown in FIG. 2, application execution (e.g., of program 202) can be observed as a sequence of computation in unprivileged mode interleaved with system calls invocations. A non-intrusive introspection tool that polls for changes in the VM memory to detect new system calls, whilst also inferring the executed system call should be faster than any system call invoked by the application. As seen in FIG. 2, a fast introspection tool 204 can poll and trace while the system call is being processed, whereas a slow introspection tool 206 may misidentify the system calls as the polling is too slow.

Figure 3A:
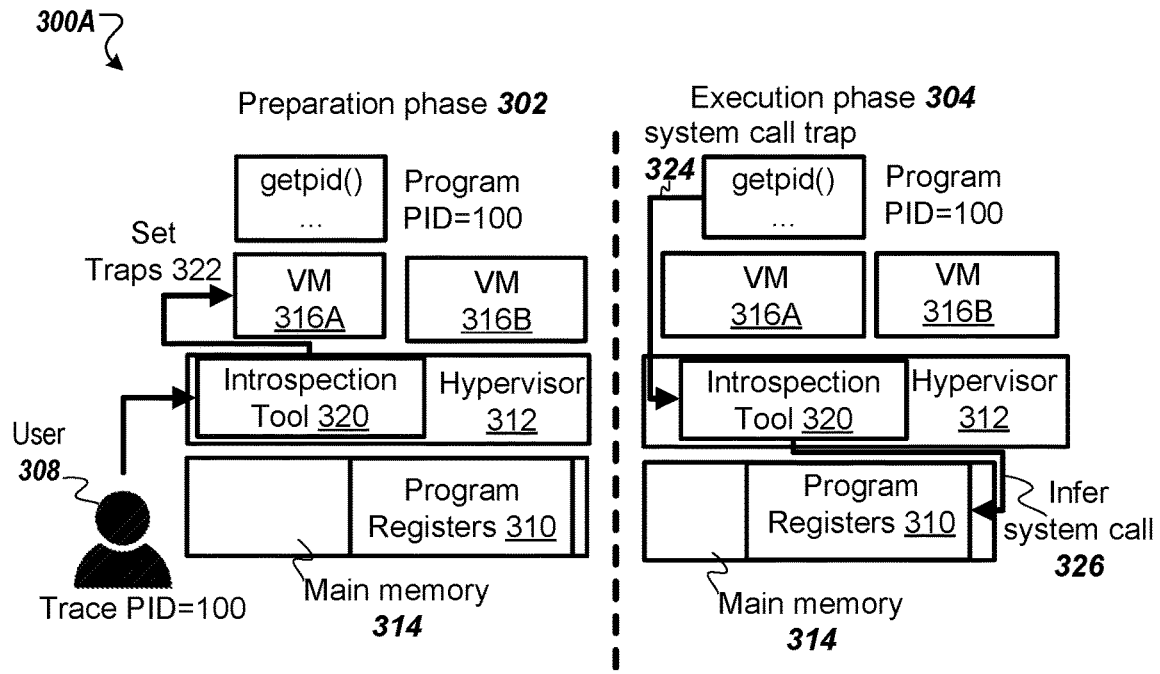
FIG. 3A is a block diagram illustrating an intrusive system call tracing process, according to at least one embodiment.

FIG. 3A is a block diagram 300A illustrating an intrusive system call tracing process, according to at least one embodiment. Each system call of the system goes through a call gate. For example, in the Linux kernel, each system call goes through the "do_syscall_64" call gate. In the preparation phase 302, an introspection tool 320 places a trap 322 on memory call from VM 316A-B to program registers 310 (e.g., "do_syscall_64"). A user 308 sets a program to trace and the introspection tool 320 infers the programs kernel stack address, and the addresses of the stored user registers associated with a user program, program registers 310. When the program executes (execution phase 304) and invokes a system call, the introspection tool receives an indication through the system call trap 324 and infers the system call at 326 by reading the values of the program registers 310. In some embodiments, the identified system call is appended to a log or trace file and stored in a common place with other inferred system calls. In some embodiments, the introspection tool 320 resides and/or is carried out by a hypervisor 312 or other guest executing structure.

Figure 3B:
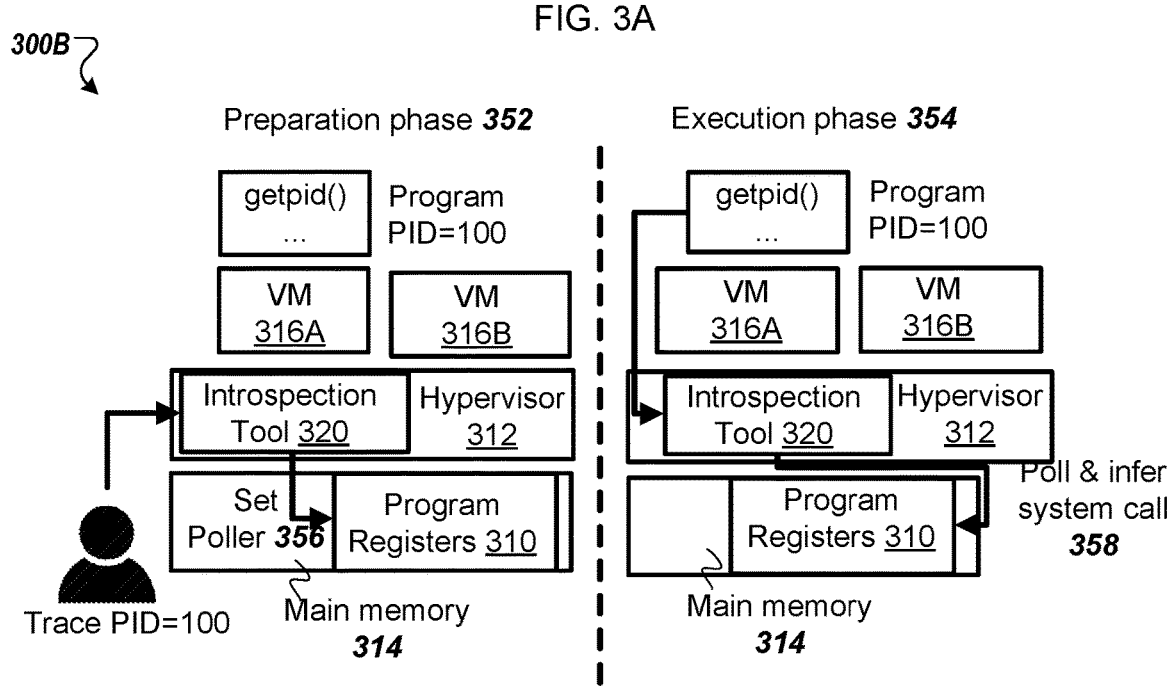
FIG. 3B is a block diagram illustrating a non-intrusive system call tracing process, according to at least one embodiment.

FIG. 3B is a block diagram 300B illustrating a non-intrusive system call tracing process, according to at least one embodiment. Each kernel stores a unique number in a register field corresponding with a user program (e.g., program registers 310) when system calls are invoked. For example, a Linux kernel stores a unique number in the "rax" register field when system calls are invoked. Specifically, an individual value is set (e.g., -ENOSYS in the Linux OS) before the system call begins and is modified once the system call concludes its execution. In the preparation phase 352, the introspection tool 320 sets a polling thread (e.g., a "poller") to continuously monitor changes for this system call indicating a unique value (e.g., -ENOSYS in the "rax" register field). During the execution phase 354, the introspection tool 320 polls and analyzes values of the program registers 310 and infers the system call at 358. In some embodiments, the identified system call is appended to a log or trace file and stored in a common place with other inferred system calls.

In the preparation phase 302, 352, the introspection tool 320 obtains information for the introspected application (e.g., getpid( ) and PID=100 as shown in FIG. 3B). The introspection tool 320 initializes a system call detection mechanism: traps for intrusive method and polling for the non-intrusive method as illustrated in FIGS. 3A-B.

It is noted that each OS can store a thread context that is often different from one another. For example, in Linux the "task-struct" structure contains per-process information. Extracting this structure contents can be achieved through various means including using a software plugin.

In some embodiments, processing logic uses a VMI approach that involves building a profile of the thread structure. The profile may reflect the Intermediate Symbol Table (IST) for a given OS kernel (e.g., Linux kernel) and provide explicit offsets of all the kernel's symbols. In some embodiments, the IST has the exact addresses of the process list head, and traversing the list utilizes VMI virtual-to-physical translation capabilities. For example, the traversal may stop when a "task-struct" with a user-provided process identifier is found. This "task-struct" may then be used in the next phase for obtaining the values of the process registers (e.g., program registers 310).

Figure 4:
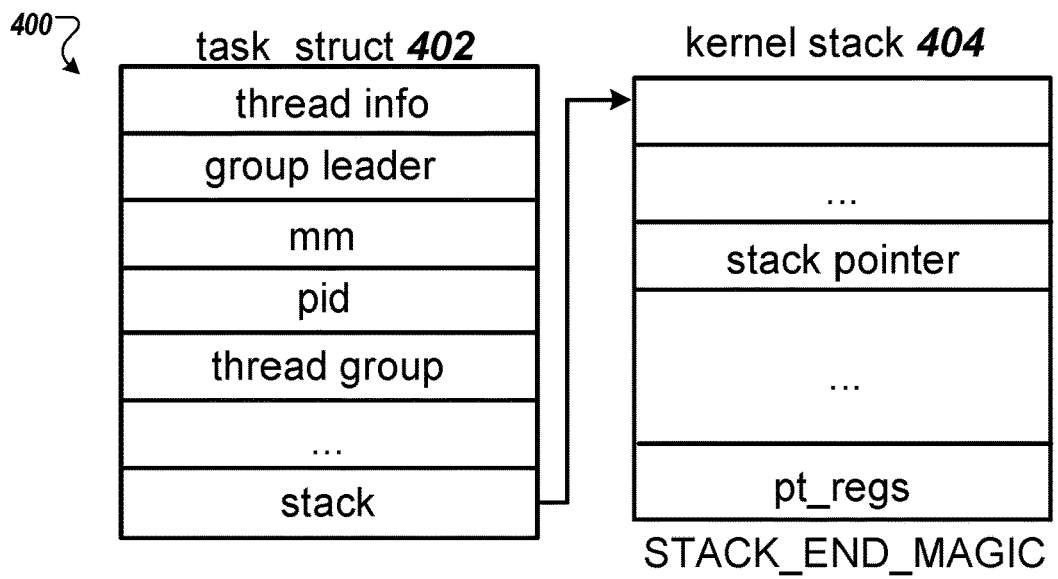
FIG. 4 is a block diagram illustrating a kernel memory structure, according to at least one embodiment.

FIG. 4 is a block diagram 400 illustrating a kernel memory structure, according to at least one embodiment. In some embodiments, the main memory (e.g., main memory 314 of FIG. 3 sometimes referred to as "kernel memory structure") may include information about a process, such as its parent, children, name, virtual memory addresses, and/or thread-related information as shown in FIG. 4. For example, the "task_struct" 402 may include a kernel stack 404 that includes individual registers with user program information.

An introspection tool (e.g., introspection tool 320 of FIG. 3) analyzes the main memory (e.g., task_struct 402 stored in the kernel region of physical memory), following the stack pointer, that points to the top of the corresponding thread's kernel stack. The kernel stack is used as a traditional stack when invoking functions in the kernel. Specifically, the kernel stack's "frames matching function" returns addresses and arguments, as well as a frame pointer. However, the kernel stack also stores thread context (e.g., "thread_info"). For example, in a Linux kernel memory structure a "thread_info" structure is stored at the top of the task_struct 402 stack and the "pt_regs" structure is stored at the bottom of the stack, and may be followed by a value used to detect unauthorized stack size modifications. The thread context (e.g., "thread_info" in Linux) is used to compute the address of the main memory and map them to addresses of the kernel memory structure (e.g., kernel stack 404). The use of the thread context may provide a two-way mapping between the kernel memory structure (e.g., kernel stack 404) and the main memory structure (e.g., "task_struct" 402).

In some embodiments, the kernel stack is page-aligned, and may be limited in size to either 16 kilobytes (KB) or 32 KB.

In some embodiments, the IST may not contain the kernel stack size, which may be required to compute the exact address of the program register structure (e.g., "pt_regs"). In some embodiments, the introspection tool can infer the exact kernel stack size and use it to compute the "pt_regs" address. For example, the introspection tool may read memory of the kernel stack from the top of the stack and can eventually reach an illegal address, which may represent the stack bottom. The introspection tool may further determine "pt_regs" structure that may be obtained by subtracting the inferred address with the size of the "pt_regs" structure, which may be available in the IST.

Figure 5:
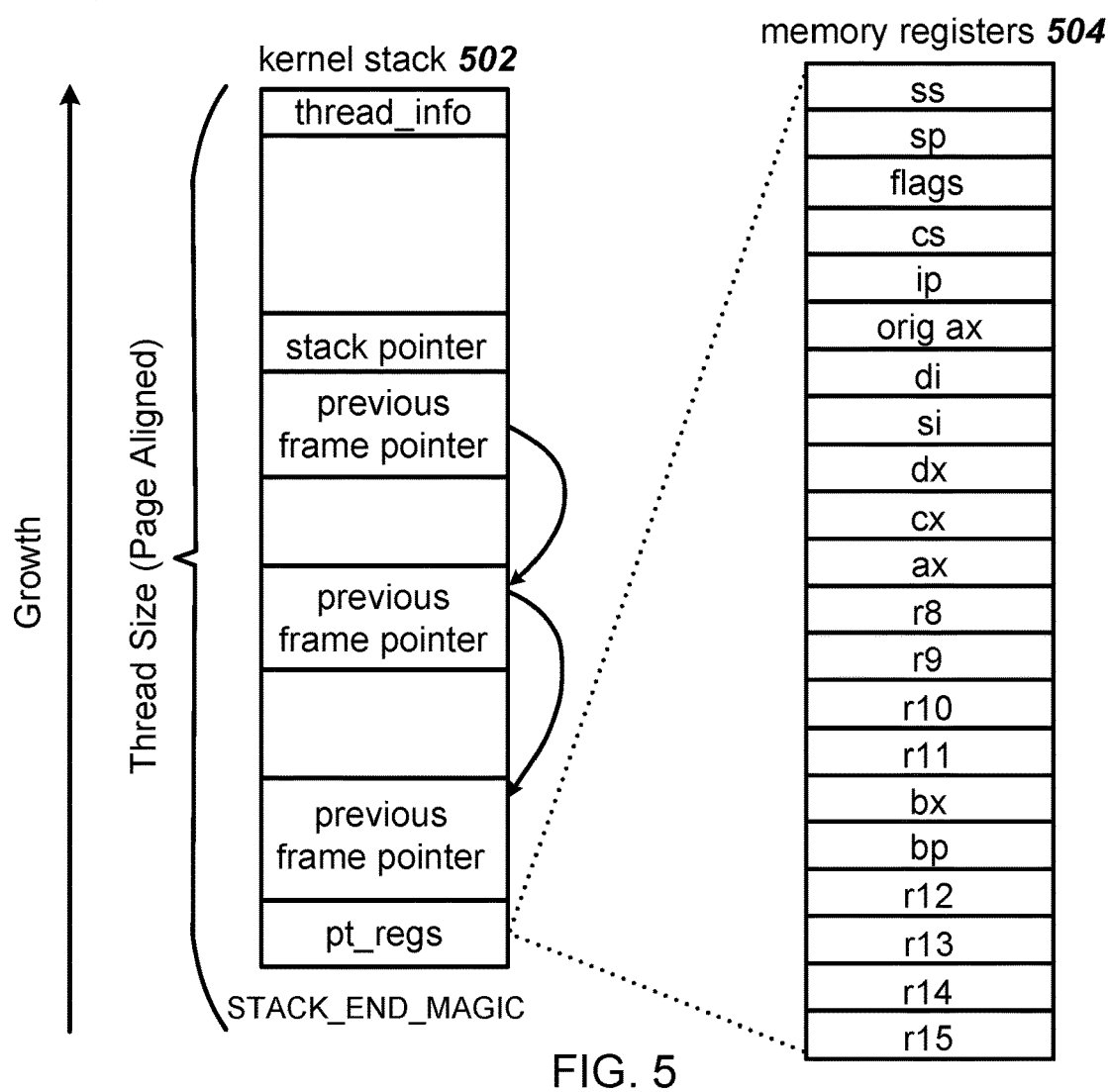
FIG. 5 is a block diagram illustrating a kernel memory structure, according to at least one embodiment.

FIG. 5 is a block diagram 500 illustrating a kernel memory structure, according to at least one embodiment. FIG. 5 depicts individual registers 504 stored in the kernel memory structure 502. The IST contains different offsets for each register field relative to the start of the "pt_regs" structure. The "pt_regs" may be leveraged to compute the absolute address for each field. The introspection tool can read the registers' values (e.g., using a VMI's memory acquisition implementation). The introspection tool may obtain registers' locations and map the content of the registers back to a system call instruction.

In some embodiments, one of the register locations (e.g., "rax" register location) stores the system call number that is being executed. This register value may be used as an identifier to invoke the appropriate system call. The arguments of a corresponding system call may be stored in corresponding register locations of individual registers 504. For example, in a Linux environment, the arguments for the system call functions may be stored in "rdi," "rsi," "rdx," "r8," "r10," and "r9."

In some embodiments, the introspection tools are implemented by placing traps on memory access to a particular physical address. For example, in a Linux environment, traps may be placed on the "do_syscall_64" physical address. The trap may invoke a call-back function that enumerates the calling process's memory by obtaining the per-thread structure. For example, an interrupt function may be generated on a specific address access. When the address is accessed by a guest, an introspective processing component (e.g., a hypervisor or a host OS) may invoke the introspection tool's system call tracing before returning control back to the VM.

In some embodiments, the introspection tools are implemented by polling accesses to a memory structure (e.g., "pt_regs") to identify when the Linux kernel is processing a new system call. The introspection tool may use a separate thread that continuously polls the addresses of the registers to identify a new system call frame.

In the execution phase, the introspection tool detects system calls and infers them using a kernel memory structure (e.g., "pt_regs"). In particular, the introspection tool may poll particular fields (e.g., "ax" and "orig_ax"). The introspection tool can infer the system call identifier using the stored values as an indexer to the Linux kernel system call table. For example, to map system calls to unique integer values.

In some embodiments, invoking a system call instruction places the next program instruction into a register field (e.g., "rip") as the return address. The instruction before the return address can contain a valid system call instruction opcode. For example, in the "x86_64" architecture, available system call instructions include the "SYSCALL," "SYSENTER," "int 0x80", and "0xCD80" data fields respectively. The introspection tool can read two bytes before the return address and match them with the aforementioned opcodes. For non-intrusive tracing embodiments, the tracing process may be performed by a background thread, which can hide the validation latency and operate independently from (e.g., does not compete with) the tracing thread.

Figure 6:
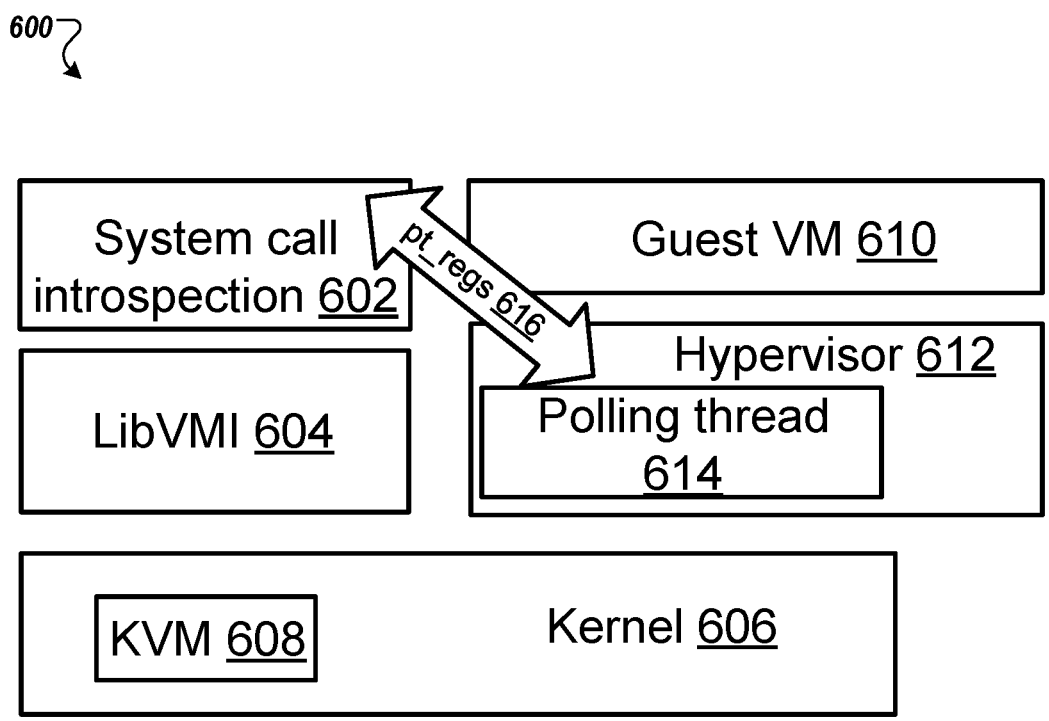
FIG. 6 is a block diagram illustrating a system call trace reconstruction, according to at least one embodiment.

FIG. 6 is a block diagram illustrating a system call trace reconstruction system 600, according to at least one embodiment. As shown in FIG. 6, the system call trace reconstruction system 600 includes a direct communication channel 616 between system call introspection component 602 and the hypervisor 612. The system call introspection component 602 may have access to the introspection library (libVMI) 604. The hypervisor 612 can wait for requests on the shared memory region from the LibVMI tracing tool. Each request can contain a physical address of the registers associated with a user program (e.g., "pt_regs"), and each register offset, which is attained from the IST. Once a request arrives, a thread (e.g., polling thread 614) may be chosen from a thread pool to continuously poll the user program specific registers (e.g., "ax") of the kernel 606 and/or kernel virtual machine (KVM) 608. Once the application terminates, the thread returns to the pool and is free to handle new requests. The polling thread 614 can continuously access the kernel registers via a cache line.

In some embodiments, the user program specific register locations are computed in the virtual address space. For example, polling for changes in the "ax" member may require translation of the virtual resource location to a physical memory location.

In some embodiments, upon a system call, the kernel 606 stores registers values associated with a user program. Once all registers are stored, one of the registers (e.g., "ax" field) can store a unique value indicating the activation or conclusion of a system call. After storing the registers' values, the kernel 606 can invoke the system call. Upon conclusion, the system calls' return value replaces the unique value ("-ENOSYS") stored in the particular portion (e.g., "ax" field) of the memory structure.

In some embodiments, the polling threads 614 executes on a different core (e.g., a hypervisor 612 and/or a guest VM 610) than the kernel 606. The polling thread 614 can observe whether the unique value ("-ENOSYS") is in the particular field (e.g., "ax" field) and further determine that a system call is currently activated based on the stored value in the particular field.

Figure 7:
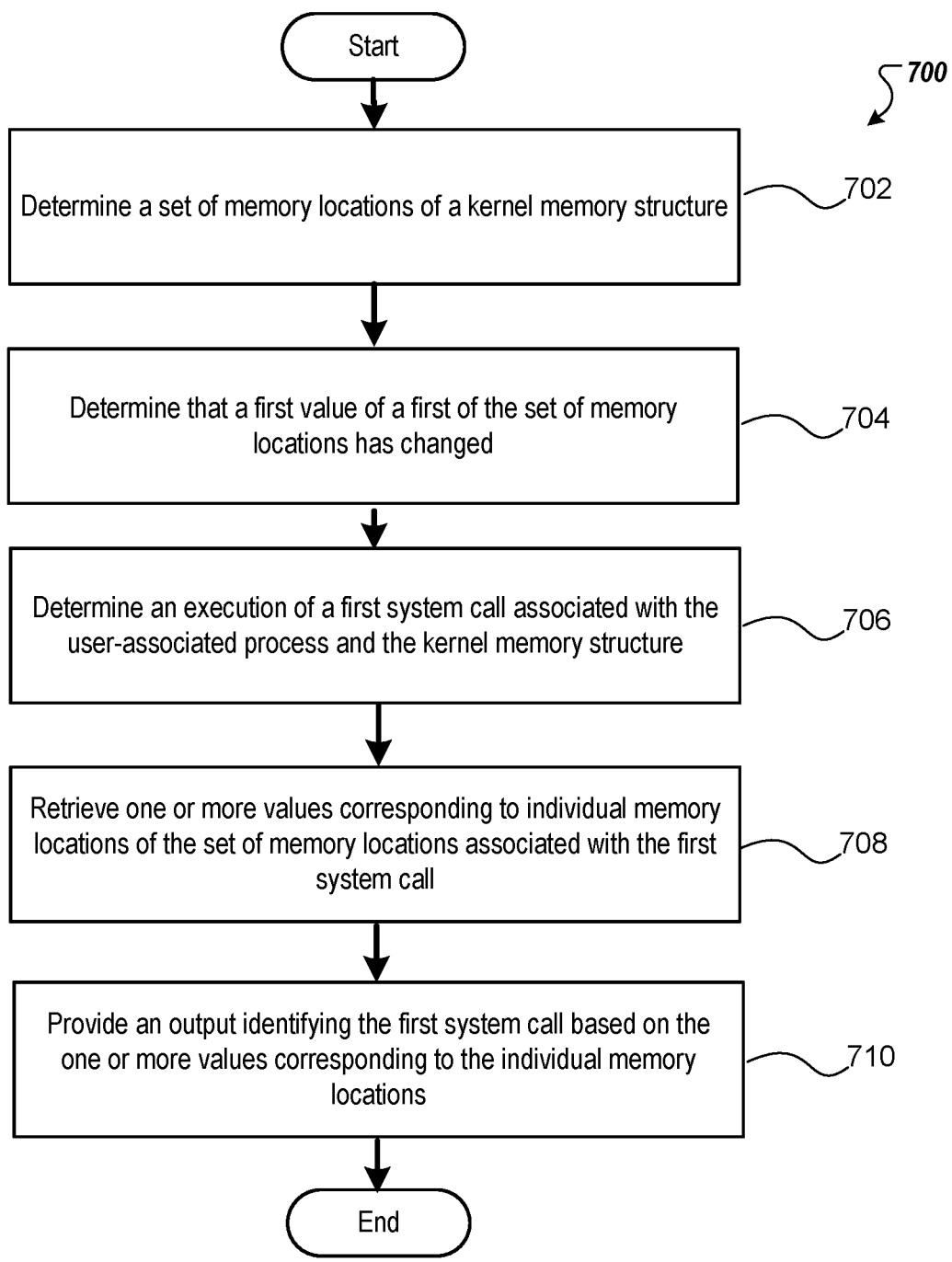
FIG. 7 is a flow diagram of a method for system call trace reconstruction, according to embodiments of the present disclosure.

FIG. 7 is a flow diagram of a method 700 for system call trace reconstruction, according to embodiments of the present disclosure. Method 700 may be performed by processing logic that may comprise hardware (circuitry, dedicated logic, etc.), software (such as executing on a general purpose computer system or dedicated machine, or any combination thereof. In one implementation, method 700 is performed by introspection tool 320 of FIG. 3, while in some other implementations, one or more blocks of FIG. 7 may be performed by one or more other machines not depicted in the figures.

At block 702, processing logic (e.g., system call introspection 602, polling thread 614) determines a set of memory locations of a kernel memory structure (e.g., kernel 606). The set of memory location corresponds with a user associated process (e.g., an application or function receiving memory allocations on a kernel memory structure). For example, in the Linux environment the set of memory locations may include data fields such as memory registers 504 of FIG. 5.

In some embodiments, the set of memory locations are associated with a user-associated process. The user associated process may correspond to a VM (e.g., a guest OS or a guest application such as, for example, guest VM 610 of FIG. 6), a container, or any other process executing within the computer system. For example, processing logic may be carried out with a hypervisor operating with the kernel memory structure who memory allocation is associated with the VM. In another embodiment, method 500 may be carried out by a first processing core and kernel operations (e.g., management of the kernel memory structure, execution of system calls, etc.) may be carried out by a second processing core. The first and second processing cores may include any combination of guest processing components (e.g., VM, hypervisor, container, etc.) and physical processing structures (e.g., non-transitory storage medium, physical processing components, native processing components, etc.).

In some embodiments, processing logic extracts data indicating a thread context of the kernel memory structure (e.g., KVM 608 and/or kernel 606 of FIG. 6). The thread context may correspond to a first OS (e.g., a Linux OS). The one or more memory locations may be determined based on the thread context. For example, thread context may include an Intermediate Symbol Table (IST) corresponding to the first OS.

In some embodiments, processing logic polls (e.g., using polling thread 614) access requests to the one or more memory locations of the kernel memory structure by a guest (e.g., guest VM 610 of FIG. 6). Processing logic may be performed by a execution entity (e.g., hypervisor) that is different from a guest (e.g., guest VM 610 of FIG. 6) operating in conjunction with the kernel memory structure. For example, the one or more processors may be carried out by a side processor such as a vSphere Management Assistant (VMA) engine and/or a peripheral component interconnect express (PCIE) device that is separate from the kernel memory structure.

At block 704, processing logic determines that a first value of a first location of the set of memory locations has changed. For example, in a Linux environment, the first value may include the "-ENOSYS" value and the first location of the set of memory locations may include the "ax" data field.

At block 706, processing logic determines an execution of a first system call associated with the user-associated process and the kernel memory structure. The change in value of a particular register may trigger recognition by an introspection tool that a system call has occurred. The introspection tool may determine, based on particular register values and/or combinations of register values, which system call was invoked.

At block 708, processing logic retrieves one or more values corresponding to individual memory locations of the set of memory locations associated with the first system call. For example, the individual memory locations of the set of memory locations may include arguments for the system call functions. In a Linux environment, these memory locations may include one or more of the "rdi," "rsi," "rdx," "r8," "r10,", and "r9" data fields.

At block 710, processing logic provides an output identifying the first system call based on the one or more values corresponding to the individual memory locations. In some embodiments, the identified system call is appended to a log or trace file and stored in a common place with other inferred system calls.

Figure 8:
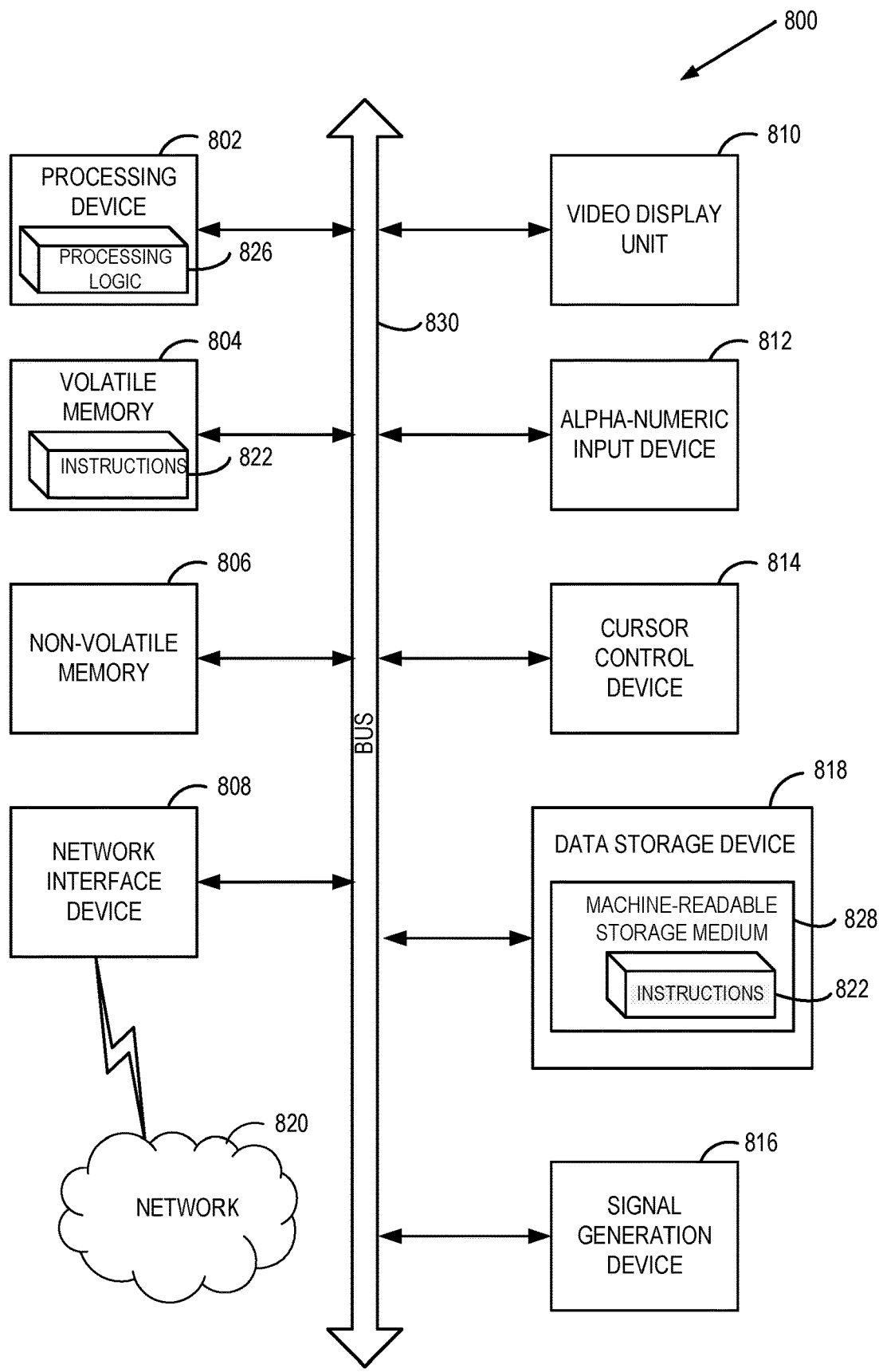
FIG. 8 depicts a block diagram of an example computing device, operating in accordance with one or more aspects of the present disclosure.

FIG. 8 depicts a block diagram of an example computing device 800, operating in accordance with one or more aspects of the present disclosure.

Example computing device 800 may be connected to other computer devices in a LAN, an intranet, an extranet, and/or the Internet. Computing device 800 may operate in the capacity of a server in a client-server network environment. Computing device 800 may be a personal computer (PC), a set-top box (STB), a server, a network router, switch or bridge, or any device capable of executing a set of instructions (sequential or otherwise) that specify actions to be taken by that device. Further, while only a single example computing device is illustrated, the term "computer" shall also be taken to include any collection of computers that individually or jointly execute a set (or multiple sets) of instructions to perform any one or more of the methods discussed herein.

Example computing device 800 may include a processing device 802 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which may communicate with each other via a bus 830.

Processing device 802 represents one or more general-purpose processing devices such as a microprocessor, central processing unit, or the like. More particularly, processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 may be configured to execute instructions implementing methods 500, 600 illustrated in FIGS. 5-6.

Example computing device 800 may further comprise a network interface device 808, that may be communicatively coupled to a network 820. Example computing device 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 may include a machine-readable storage medium (or, more specifically, a non-transitory machine-readable storage medium) 828 on which is stored one or more sets of executable instructions 822. In accordance with one or more aspects of the present disclosure, executable instructions 822 may comprise executable instructions associated with executing methods 500, 600 illustrated in FIGS. 5-6.

Executable instructions 822 may also reside, completely or at least partially, within main memory 804 and/or within processing device 802 during execution thereof by example computing device 800, main memory 804 and processing device 802 also constituting computer-readable storage media. Executable instructions 822 may further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

In at least one embodiment, FIG. 8 illustrates a system, which includes interconnected hardware devices or "chips." In at least one embodiment, FIG. 8 may illustrate an example SoC. In at least one embodiment, devices illustrated in FIG. 8 may be interconnected with proprietary interconnects, standardized interconnects such as, for example, Perpheral Component Interconnect Express (PCIe), or some combination thereof. In at least one embodiment, one or more components of computing device 800 are interconnected using compute express link ("CXL") interconnects.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As a non-limiting example, a "processor" may be a network device. A "computing platform" may comprise one or more processors. As used herein, "software" processes may include, for example, software and/or hardware entities that perform work over time, such as tasks, threads, and intelligent agents. Also, each process may refer to multiple processes for continuously or intermittently carrying out instructions in sequence or in parallel. In at least one embodiment, the terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
   identifying, by one or more processors, a kernel memory structure, comprising a set of memory locations storing data indicative of one or more parameters of a user-associated process;
   monitoring, by the one or more processors, accesses to the kernel memory structure by the user-associated process to identify a first system call corresponding to the user-associated process;
   responsive to detecting a change in a first value of a first memory location of the set of memory locations, determining, by the one or more processors, that an execution of the first system call has occurred, wherein the first value indicates a status of the first system call;
   responsive to determining that the execution of the first system call has occurred, retrieving, by the one or more processors, one or more values of one or more second memory locations of the set of memory locations, the one or more second memory locations being associated with the first system call; and
   providing, by the one or more processors, an output identifying the first system call based on the one or more values of the one or more second memory locations.

2. The method of claim 1, further comprising:
   extracting, by the one or more processors, data indicating a thread context of the kernel memory structure, wherein the thread context corresponds to a first operating system (OS), wherein the set of memory locations are determined based on the thread context.

3. The method of claim 2, wherein the data comprises a first Intermediate Symbol Table (IST) corresponding to the first OS.

4. The method of claim 1, wherein the user-associated process corresponds to a virtual machine (VM) and the one or more processors are associated with a hypervisor, wherein at least a portion of the method is carried out by the hypervisor.

5. The method of claim 1, further comprising:
   determining, by the one or more processors, an instance of malware associated with the user-associated process based on an identity of the first system call; and
   providing, by the one or more processors, a second output indicating the instance of malware.

6. The method of claim 1, further comprising:
   polling, by the one or more processors, access requests to the set of memory locations of the kernel memory structure.

7. The method of claim 1, wherein the kernel memory structure corresponds to a kernel stack of a first operating system.

8. The method of claim 7, further comprising:
   determining, by the one or more processors, a null character within a third memory location of the kernel memory structure, wherein the set of memory locations are determined based on a proximity between the set of memory locations and the third memory location.

9. A computing system, comprising:
   a memory; and
   one or more processors, coupled to the memory, to:
      identify a kernel memory structure, comprising a set of memory locations storing data indicative of one or more parameters of a user-associated process;
      monitor accesses to the kernel memory structure by the user-associated process to identify a first system call corresponding to the user-associated process;
      responsive to detecting a change in a first value of a first memory location of the set of memory locations, determine that an execution of the first system call has occurred, wherein the first value indicates a status of the first system call;
      responsive to determining that the execution of the first system call has occurred, retrieve one or more values of one or more second memory locations of the set of memory locations, the one or more second memory locations being associated with the first system call; and
      provide an output identifying the first system call based on the one or more values of the one or more second memory locations.

10. The computing system of claim 9, wherein the one or more processors are further to:
    extract data indicating a thread context of the kernel memory structure, the thread context corresponding to a first operating system (OS), wherein the set of memory locations are determined based on the thread context.

11. The computing system of claim 10, wherein the data comprises a first Intermediate Symbol Table (IST) corresponding to the first OS.

12. The computing system of claim 9, wherein the one or more processors are further to:
    determine an instance of malware associated with the user-associated process based on an identity of the first system call; and
    provide a second output indicating the instance of malware.

13. The computing system of claim 9, wherein the one or more processors are further to:
poll access requests to the set of memory locations of the kernel memory structure.

14. The computing system of claim 9, wherein the kernel memory structure corresponds to a kernel stack of a first operating system.

15. The computing system of claim 9, wherein the user-associated process corresponds to a virtual machine (VM) and the one or more processors are associated with a hypervisor.

16. A non-transitory computer-readable storage medium comprising instructions that, when executed by one or more processors, cause the one or more processors to perform operations comprising:
identifying a kernel memory structure comprising a set of memory locations storing data indicative of one or more parameters of a user-associated process;
monitoring accesses to the kernel memory structure by the user-associated process to identify a first system call corresponding to the user-associated process;
responsive to detecting a change in a first value of a first memory location of the set of memory locations, determining that an execution of the first system call has occurred, wherein the first value indicates a status of the first system call;
responsive to determining that the execution of the first system call has occurred, retrieving one or more values of one or more second memory locations of the set of memory locations, the one or more second memory locations being associated with the first system call; and
providing an output identifying the first system call based on the one or more values of the one or more second memory locations.

17. The non-transitory computer-readable storage medium of claim 16, wherein the instructions further cause the one or more processors to perform operations comprising:
extracting data indicating a thread context of the kernel memory structure, the thread context corresponding to a first operating system (OS), wherein the set of memory locations are determined based on the thread context.

18. The non-transitory computer-readable storage medium of claim 16, wherein the instructions further cause the one or more processors to perform operations comprising:
determining an instance of malware associated with the user-associated process based on an identity of the first system call; and
providing a second output indicating the instance of malware.

19. The non-transitory computer-readable storage medium of claim 18, wherein the user-associated process corresponds to a virtual machine (VM) and the one or more processors are associated with a hypervisor.

20. The non-transitory computer-readable storage medium of claim 16, wherein the kernel memory structure corresponds to a kernel stack of a first operating system.

* * * * *